United States Patent
Urbanek

[19]
[11] Patent Number: 5,879,597
[45] Date of Patent: Mar. 9, 1999

[54] METHOD FOR OPERATING AN INJECTION SYSTEM

[75] Inventor: Otto Urbanek, Linz, Austria

[73] Assignee: Engel Maschinenbau Gesellschaft m.b.H., Schwertberg, Austria

[21] Appl. No.: 771,380

[22] Filed: Dec. 16, 1996

[30] Foreign Application Priority Data

Dec. 27, 1995 [AT] Austria .................................. 2103/95

[51] Int. Cl.⁶ .................................................. B29C 45/50
[52] U.S. Cl. ..................... 264/40.1; 264/328.1; 264/349; 366/78; 425/145
[58] Field of Search ................................. 264/40.1, 40.5, 264/40.7, 328.1, 349; 425/135, 145, 159, 166

[56] References Cited

U.S. PATENT DOCUMENTS

| | | | |
|---|---|---|---|
| 4,540,359 | 9/1985 | Yamazaki | 425/135 |
| 4,741,685 | 5/1988 | Inaba et al. | 425/145 |
| 4,753,588 | 6/1988 | Kiya | 425/145 |
| 4,851,171 | 7/1989 | Shimizu et al. | 425/149 |
| 4,879,077 | 11/1989 | Shimizu et al. | 425/145 |
| 4,929,165 | 5/1990 | Inaba et al. | 425/150 |
| 5,102,587 | 4/1992 | Kumamura et al. | 425/145 |
| 5,362,222 | 11/1994 | Faig et al. | 425/145 |

*Primary Examiner*—Jill L. Heitbrink
*Attorney, Agent, or Firm*—Notaro & Michalos P.C.

[57] ABSTRACT

In a method for operating a drive, in particular for an injection system of an injection molding machine, wherein a spindle (7) is provided drivable by a first electric motor (14), on which spindle a nut (15) is borne which is drivable by a second electric motor (20) and borne so as to be axially non-displaceable, a translation movement of the spindle (7) is brought about by driving the nut (15) by means of the second electric motor (20) or by driving the spindle (7) by means of the first electric motor (14). To increase the dynamics of the driving during the conveyance of an acceleration or, respectively, retardation ramp of the translation movement of the spindle (7) by means of one of the two electric motors (14, 20) the other electric motor (20, 14) is briefly driven in that rotational direction which supports the acceleration or, respectively, the retardation of the translation movement of the spindle (7).

9 Claims, 3 Drawing Sheets

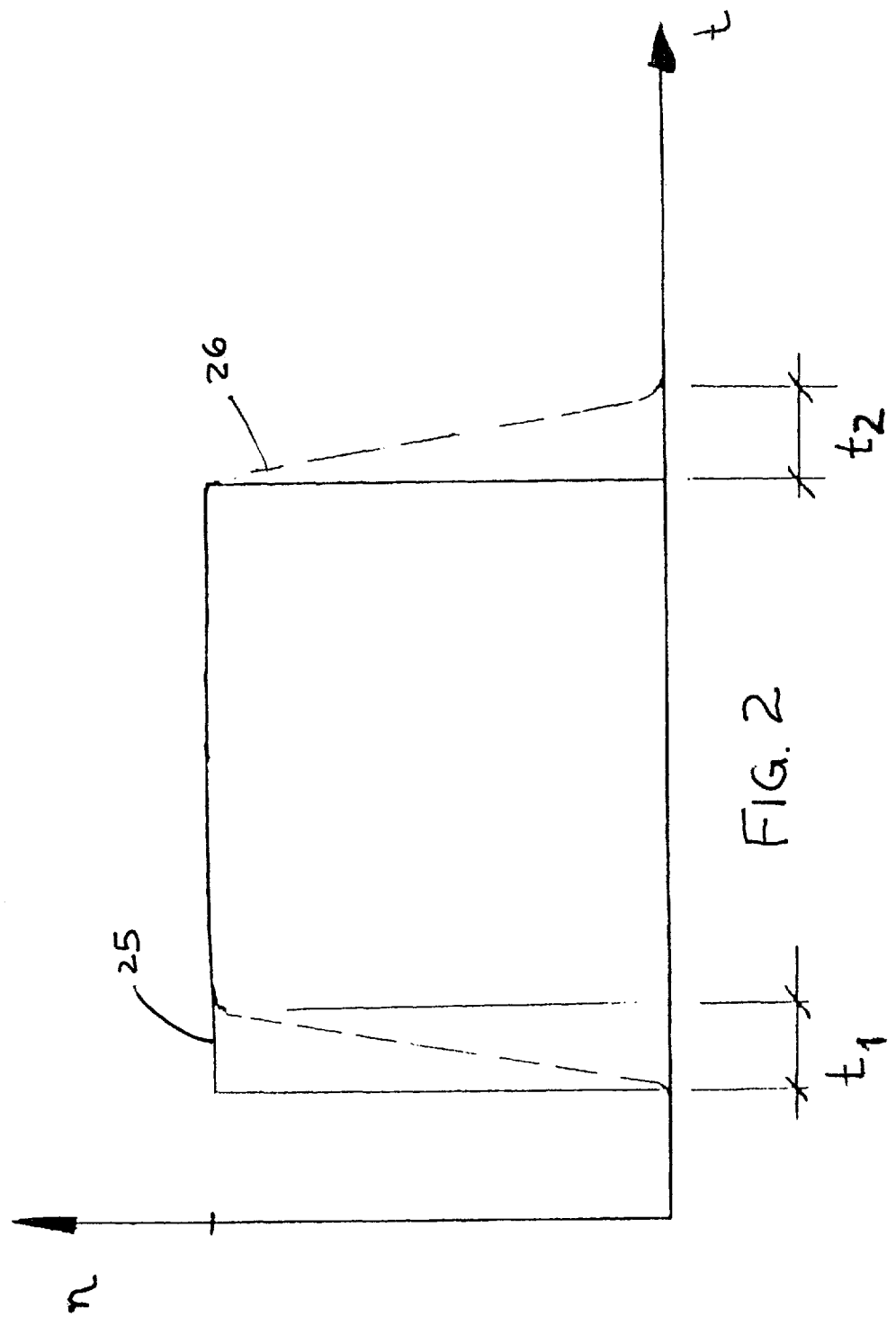

METHOD FOR OPERATING AN INJECTION SYSTEM

FIELD AND BACKGROUND OF THE INVENTION

The invention relates to a method for operating an injection system for injection molding machines with a melting cylinder with melting worm and two electric motors, preferably servomotors, for driving the melting worm whose rear end is connected so as to be torsion-tight with a spindle, which can be driven by the first electric motor and on which a nut is borne drivable by the second electric motor, wherein for the injection a translational movement of the worm results from the nut being driven by means of the second electric motor.

An injection system of this type is already disclosed in DE-OS 43 44 335. The conventional operation of such injection system proceeds as follows: for melting and transporting the material into the antechamber of the worm the spindle and the nut are driven by the first and the second electric motor in the same direction. The plastifying performance results therein from the rotational speed of the worm which is determined by the rotational speed of the spindle or, respectively, of the first electric motor. In order to bring about during plastification a return-stroke speed of the worm through which the back dynamic pressure of the plastificate in the antechamber of the worm is determined, the spindle and the nut are driven at a slightly different rotational speed. For the subsequent injection of the plastificate the first motor, which drives the spindle, is stopped and the nut is driven in the corresponding direction via the second motor.

In the course of the machine cycle, the driving unit for the injection is switched between different operating states. For example, the injection speed at the beginning of the injection process increases from zero to a given value. Further switching takes place between the pre-injection and the application of the dwell pressure.

It should be possible to complete such switching processes as rapidly as possible, i.e. the dynamics of the driving system for the injection should be as high as possible. In the conventional operating type of an injection system cited above, the dynamics of the driving system for the injection through the applicable torque of the second electric motor used in combination with the mass inertia of the system is limited.

It is furthermore desirable that a maximum injection speed which is as high as possible can be brought about. In the conventional operating mode of the above cited injection system the injection speed is determined by the maximum speed at which the nut can be driven by the second electric motor.

SUMMARY OF THE INVENTION

It is the task of the invention to describe a method for operating an injection system of the above cited type with which the dynamics of the driving system of the injection can be improved or, respectively, the injection speed can be increased.

According to the invention this is accomplished in the case of an injection unit of the type cited in the introduction thereby that during the driving of the nut by means of the second electric motor during the injection at least intermittently the spindle is driven by means of the first electric motor.

This permits an increase of the dynamics of the driving of the injection if the first electric motor during the start-up or, respectively, the braking phase of the second electric motor is briefly driven with the spindle being rotated in the direction which leads to a linear movement of the worm which is directed with the acceleration being exerted onto the worm by the second electric motor.

An increase of the injection speed can be attained if during the injection process the first electric motor drives the spindle in the opposite direction in which the nut is being driven by the second motor and by opening a decoupling mechanism, the transfer of the rotational movement of the spindle onto the worm is avoided.

BRIEF DESCRIPTION OF THE DRAWINGS

In the following, further advantages and details of the invention will be explained in further detail with reference to the attached drawing. In it depict.

DESCRIPTION OF THE PREFERRED EMBODIMENTS

Figure 1:
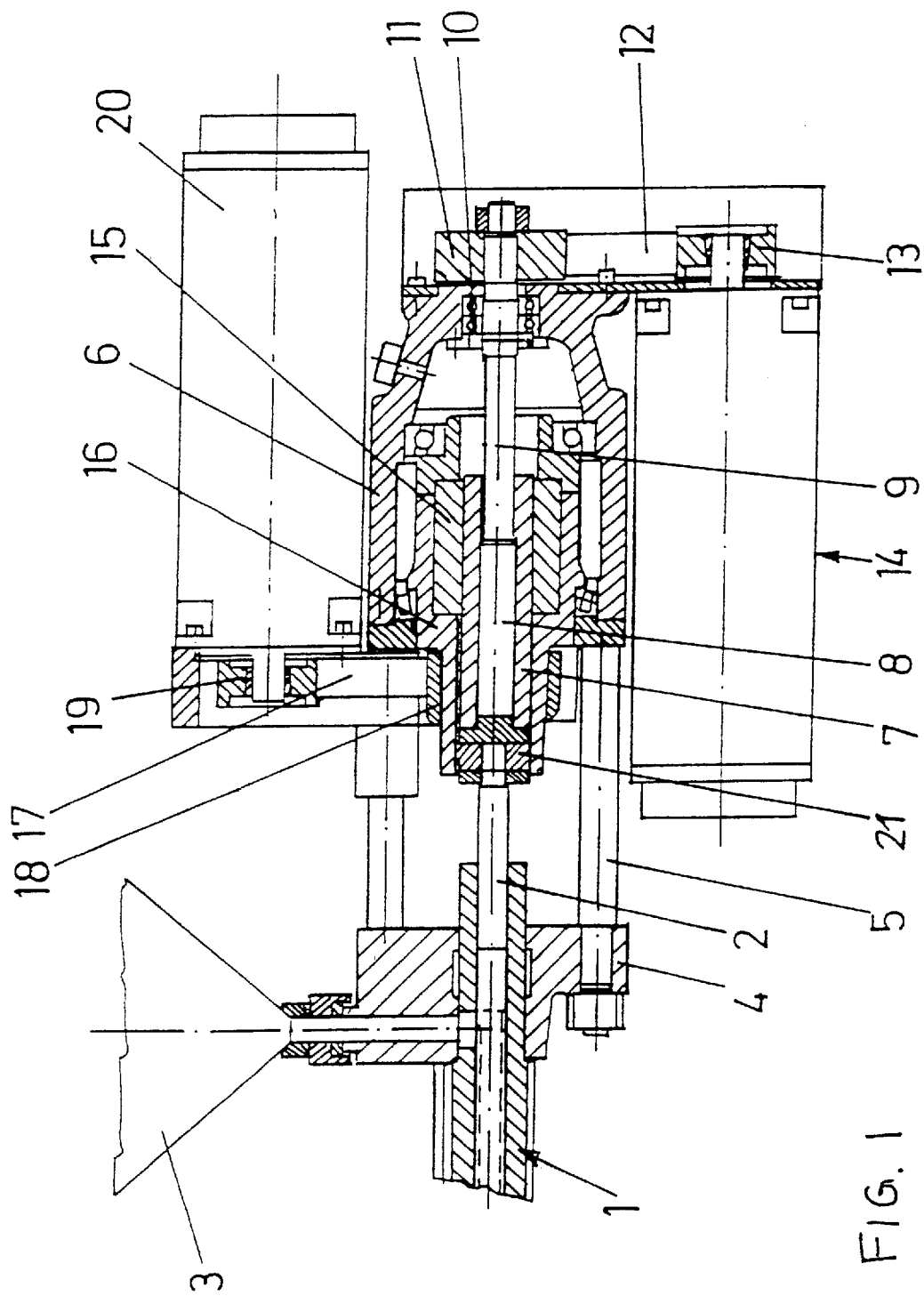
FIG. 1 an axial section through an injection system of the type described in the introduction, FIG. 2 a diagram of the jump response of the second electric motor which drives the nut, FIG. 3a a diagram which shows the jump response improved through the method according to the invention, and FIG. 3b a diagram showing the driving of the second electric motor.

In the injection system depicted in FIG. 1 a plastification worm 2 is received in conventional manner in the plastification cylinder 1. Above the plastification cylinder 1 is disposed a feed funnel 3 for synthetic granulates.

The plastification cylinder 1 is connected via a support plate 4 and rods 5 with a drive housing 6. The rear end of the plastification worm 2 is connected with a spindle 7. The spindle 7 comprises an axial sparing 8 into which projects a drive shaft implemented as a spline shaft. The drive shaft 9 is supported by means of a bearing 10 in the drive housing 6.

The drive shaft 9 is provided at the rear end with a belt pulley 11 over which a drive belt 12 runs which connects the belt pulley 11 with the belt pulley 13 of a first electric motor 14.

On the spindle 7 is borne a nut 15 which is borne torsion-tight in a carrier housing 16. On the portion of the carrier housing 16 projecting from the drive housing, in turn, a belt pulley 18 is fastened which is connected via a drive belt 17 with the belt pulley 19 of a second electric motor 20.

The second electric motor 20 rotates the nut 15 on the spindle 7. The first electric motor 14 rotates the spindle 7 via the drive shaft 9.

As already stated, the drive shaft 9 is implemented as a spline shaft which engages a corresponding spline profile in the spindle 7. However, the spindle 7 and the drive shaft 9 can also be implemented integrally. In this case, the belt pulley 11 would need to be supported displaceably on the drive shaft 9.

Advantageously a pressure meter device is provided by means of which the pressure in the plastification cylinder 1 is determined and the rotational speed of the second electric motor 20, which rotates the nut, is controlled.

The conventional operating manner of such injection system proceeds as follows: the second electric motor 20 and the first electric motor 14 are initially moved simultaneously in the same direction of rotation, for example in the counterclockwise direction, such that the spindle 7 and the nut 15 rotate at the same rotational number. The plastification worm 2 is thereby retained such that it is axially non-displaceable but it is rotated.

When in the plastification cylinder 1 a predetermined pressure has been reached, the rotational number of the second motor 20 is regulated so that the pressure in the plastification cylinder 1 remains constant during the plasticizer stroke. During this time the first motor 14 continues to run at the same rotational speed and determines the plasticizer performance of the injection system. Through the difference of the rotational number of the two motors 20, 14 a return-stroke movement of the worm 2 results.

The second electric motor 14 stops for the injection process. The first electric motor 20 is now driven in the clockwise direction whereby the spindle 7 and thus the plastification worm 2 are moved in the direction toward the injection mold and the injection process is completed.

In FIG. 2 the switching between different operating states of the second electric motor 20 is shown. If as the nominal value setting according to which the rotational number n of the second electric motor 20 is to be changed, a step function 25 is selected, the line 26 plotted in dot-dash lines in FIG. 2 is obtained as a jump response. Consequently, for starting a starting time $t_1$ and for braking a braking time $t_2$ are required which are a function of the torque of the second motor 20 and of the total mass to be moved. At a given configuration switching between two operating states of the second motor 20 cannot occur faster than with these times $t_1$, $t_2$ which limit in the conventional operating mode the dynamics of the driving system for the injection. Instead of referring the jump response to time t, it can also be represented as a function of the course or as a function of the pressure.

It is likewise possible to represent the jump response for the injection speed which in the case of the conventional operating mode is proportional to the rotational number n of the second electric motor 20, as function of time, of the course or of pressure.

Figure 3A:
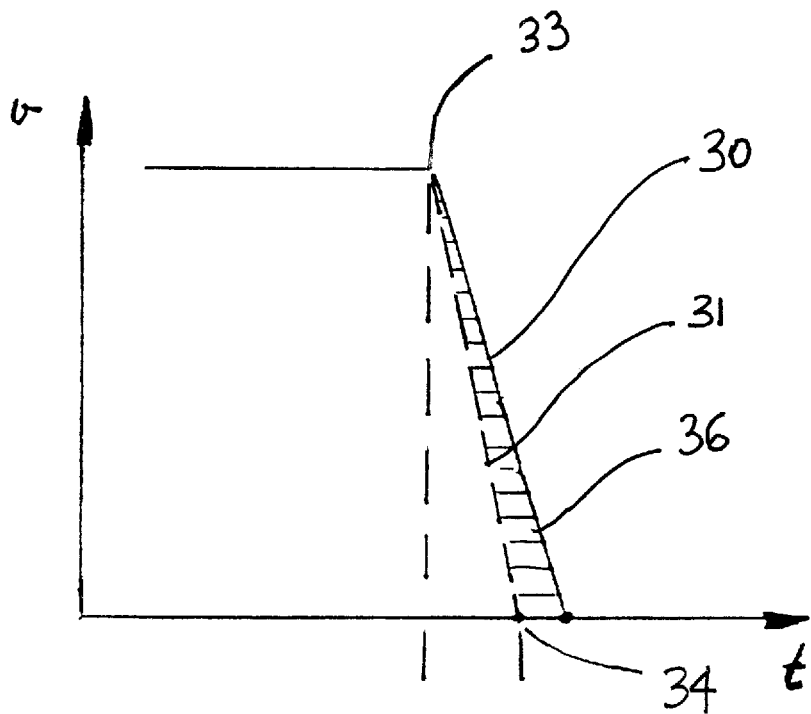
Figure 3B:
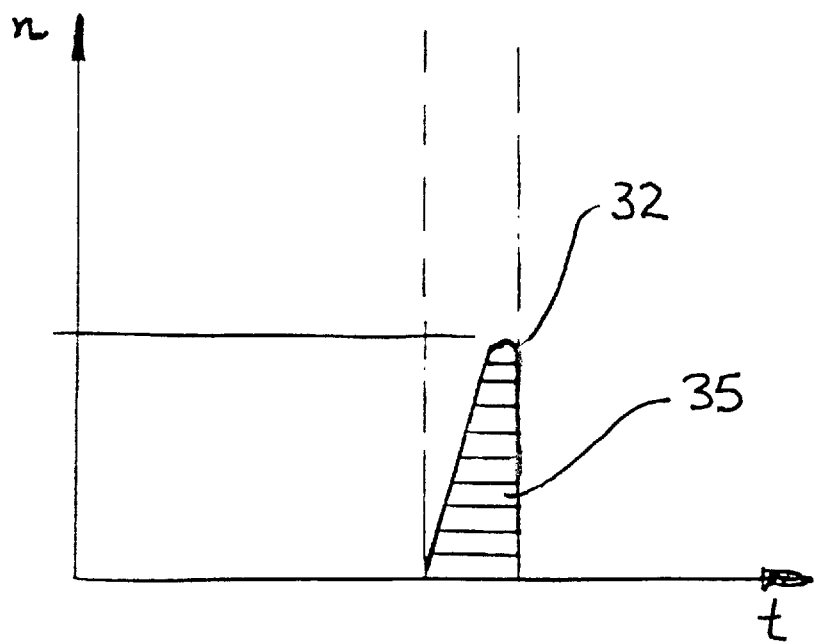

With reference to FIGS. 3a and 3b, a first aspect of the operating mode according to the invention will be explained. By 30 is denoted the speed of the injection as a function of time t which corresponds to the jump response of the second electric motor 20 at the end of the injection. In order to reach a desired brake ramp 31 which is steeper than the brake ramp 30 corresponding to the jump response of the second electric motor 20, according to the invention during the brake phase of the second electric motor 20 the first electric motor 14 is briefly driven and specifically in such a way that the spindle 7 rotates in the same direction of rotation as nut 15. This driving is shown in FIG. 3b as line 32. The line 32 corresponding to the driving starts increasing approximately at the beginning 33 of the desired ramp 31 and ends with the end 34 of the desired ramp 31. The work to be performed by the first electric motor 14 during its driving is given by the area 35 under line 32 and must correspond to the work [SIC] indicated by the area 36 between the ramp 30 corresponding to the jump response and the desired ramp 31.

Analogously also a starting ramp of the injection unit can be achieved which has a shorter rise time than the rise time corresponding to the jump response of the second electric motor 20. The second electric motor 20 is driven in this case such that the spindle 7 rotates in the opposite direction of rotation as nut 15. In general, according to the invention the first electric motor 14 is always driven during the start or brake phase of the second electric motor 20 such that the direction of rotation of spindle 7 leads to a movement of the worm 2 whose translation component is directed in the same direction as the acceleration direction which is exerted onto the worm 2 by the second motor 20. The dynamics of the driving for the injection is thereby significantly increased.

According to a second aspect of the operating mode according to the invention the maximum value of the injection speed can be increased thereby that during the injection process the first electric motor 14 the spindle 7 into the direction opposite to that in which the nut 15 is driven by the second motor 20. In order to prevent an undesirable rotation of worm 2, a decoupling mechanism 21 is provided. By opening this decoupling mechanism 21 only the translation component of the movement of spindle 7 is transferred to the worm but not its rotational movement.

I claim:

1. A method of operating an injection system of an injection molding machine which is performing an injection-stroke, the injection system comprising an axially displaceable spindle connected to a screw, said spindle being rotatable by a first electric motor, and a nut which is supported on said spindle such that the nut is rotatable but not axially displaceable, said nut being rotatable by a second electric motor, said method comprising the steps of:

conveying an acceleration to said spindle in an axial direction by accelerating said second electric motor which is rotating the nut in a first direction of rotation; and driving said first electric motor during acceleration of said second electric motor in a direction of rotation in which the spindle is rotated in a second direction of rotation which is contrary to said first direction of rotation.

2. The method according to claim 1, wherein a jump response to a switching between two different operation states having different rotation speeds of said second electric motor is defined for said injection system, said method further comprising:

calculating an amount of work corresponding to the difference between said jump response and a desired response to a switching between said two different operation states; and driving said first electric motor during acceleration of said second electric motor so as to perform said amount of work.

3. A method of operating an injection system of an injection molding machine which is performing an injection stroke, the injection system comprising an axially displaceable spindle connected to a screw, said spindle being rotatable by a first electric motor, and a nut which is supported on said spindle such that it is rotatable but not axially displaceable, said nut being rotatable by a second electric motor; said method comprising the steps of:

conveying an acceleration to said spindle in an axial direction by accelerating said first electric motor which is rotating the spindle in a first direction of rotation; and driving said second electric motor during acceleration of said first electric motor in a direction of rotation in which the nut is rotated, in a second direction of rotation which is contrary to said first direction of rotation.

4. The method according to claim 3, wherein a jump response to a switching between two different operation states having different rotation speeds of said first electric motor is defined for said injection system, said method further comprising:

calculating an amount of work corresponding to the difference between said jump response and a desired response to a switching between said two different operation states; and driving said second electric motor during acceleration of said first electric motor so as to perform said amount of work.

5. A method of operating an injection system of an injection molding machine which is performing an injection-stroke, the injection system comprising an axially displaceable spindle connected to a screw, said spindle being rotatable by a first electric motor and a nut which is supported on said spindle such that it is rotatable but not axially displaceable, said nut being rotatable by a second electric motor; said method comprising the steps of:

conveying a retardation to said spindle which is moving in an axial direction by retarding said second electric motor which is rotating the nut in a first direction of rotation; and driving said first electric motor in a direction of rotation in which the spindle is rotated in said first direction of rotation during retardation of said second electric motor.

6. The method according to claim 5, wherein a jump response to a switching between two different operation states having different rotation speeds of said second electric motor is defined for said injection system, said method further comprising:

calculating an amount of work corresponding to the difference between said jump response and a desired response to a switching between said two different operation states; and driving said first electric motor during retardation of said second electric motor to perform said amount of work.

7. A method of operating an injection system of an injection molding machine which is performing an injection-stroke, the injection system comprising an axially displaceable spindle connected to a screw, said spindle being rotatable by a first electric motor and a nut which is supported on said spindle such that it is rotatable but not axially displaceable, said nut being rotatable by a second electric motor; said method comprising the steps of:

conveying a retardation to said spindle when it is moving in an axial direction by retarding said first electric motor which is rotating the spindle in a first direction of rotation; and driving the second electric motor in a direction of rotation in which the nut is rotated in said first direction of rotation during retarding of said first electric motor.

8. The method according to claim 7, wherein a jump response to a switching between two different operation states having different rotation speeds of said first electric motor is defined for said injection system, said method further comprising:

calculating an amount of work which corresponds to the difference between the jump response and a desired response to a switching between said two different operation states; and driving said second electric motor during retardation of said first electric motor to perform said amount of work.

9. A method of operating an injection system of an injection molding machine, the injection system comprising an axially displaceable spindle connected to a screw by a decoupling mechanism, such that when the decoupling mechanism is closed a rotation and an axial displacement of said spindle is transferred to said screw, and when said decoupling mechanism is opened only the axial displacement of said spindle is transferred to said screw, said spindle being rotatable by a first electric motor and a nut supported on said spindle such that it is rotatable but not axially displaceable, said nut being rotatable by a second electric motor; said method comprising:

plastifying a plastic material in said screw by closing the decoupling mechanism and rotating said spindle with said first electric motor and said nut with said second electric motor both in a first same direction of rotation;

performing an injection-stroke by performing the following steps:

opening said decoupling mechanism;

rotating said nut with the second electric motor in a first direction of rotation; and rotating said spindle by said first electric motor in a second direction of rotation.

* * * * *